United States Patent [19]

Nakai et al.

[11] Patent Number: 5,283,103
[45] Date of Patent: Feb. 1, 1994

[54] FIBER-REINFORCED PLASTIC PRODUCT

[75] Inventors: Kiyotaka Nakai; Masahiro Narita, both of Chita, Japan

[73] Assignee: Aisin Seiki Kabushiki Kaisha, Kariya, Japan

[21] Appl. No.: 953,138

[22] Filed: Sep. 29, 1992

[30] Foreign Application Priority Data

Sep. 30, 1991 [JP] Japan .................. 3-252337

[51] Int. Cl.$^5$ .................. B32B 3/00; B32B 17/02
[52] U.S. Cl. .................. 428/172; 428/113; 428/161; 428/163; 428/167; 428/174; 428/182; 428/228; 428/364; 428/375
[58] Field of Search .......... 428/156, 172, 34.5, 428/36.6, 34.7, 36.2, 36.3, 68, 114, 105, 113, 141, 192, 364, 375, 480, 910, 161, 163, 167, 174, 228, 182

[56] References Cited

U.S. PATENT DOCUMENTS 4,737,208 4/1988 Bloechle et al. .................. 428/172
4,752,520 6/1988 Franklin .................. 428/172
4,781,956 11/1988 Zimmermann et al. .................. 428/172

FOREIGN PATENT DOCUMENTS

3-7027 1/1991 Japan .

*Primary Examiner*—Donald J. Loney
*Attorney, Agent, or Firm*—Burns, Doane, Swecker & Mathis

[57] ABSTRACT

A fiber-reinforced plastic product comprises a first member which is formed by pressing from a sheet molding compound made of an unsaturated polyester resin and having a first portion which should be reinforced and a second portion having an area adjacent to the first portion, a second member made of a uni directional sheet molding compound made of the unsaturated polyester resin, including a bundle of glass fibers which is continuously formed so as to be arranged in the same direction, and overlayed on the first portion by the press formation, and a concave portion formed in the area. Thereby, the second member is prevented from expanding along the first member during the press formation.

5 Claims, 11 Drawing Sheets

| | | first embodiment | second embodiment | third embodiment | fourth embodiment | first comparative example | second comparative example | third comparative example |
|---|---|---|---|---|---|---|---|---|
| second member width (mm) | II - II | 88 | 87 | 95 | 83 | 115 | 161 | 133 |
| | B-B | 97 | 88 | 93 | 83 | 101 | 133 | 120 |
| | C-C | 99 | 86 | 91 | 83 | 103 | 131 | 118 |
| | evaluation | ○ | ○ | ○ | ○ | x | x | x |
| deflection (mm) | load 5.0 kg | 3.1 | 3.1 | 3.2 | 2.8 | 3.7 | 4.4 | 3.7 |
| | load 10.0 kg | 6.7 | 6.6 | 6.8 | 6.2 | 7.6 | 9.9 | 7.7 |
| | evaluation | ○ | ○ | ○ | ○ | x | x | x |
| total evaluation | | ○ | ○ | ○ | ○ | x | x | x |

Fig. 16

FIBER-REINFORCED PLASTIC PRODUCT

BACKGROUND OF THE INVENTION

1. Field of the Invention

The present invention relates to a fiber-reinforced plastic product which is formed from a sheet molding compound, and especially relates to a fiber-reinforced plastic product comprising a bundle of glass fibers which is continuously formed so as to be arranged in the same direction.

2. Description of the Related Art

A conventional fiber-reinforced plastic product related to the present invention is disclosed in Japanese utility model application laid-open publication No. 3(1991)-7027 published without examination on Jan. 23, 1991. In this prior art, a fiber-reinforced plastic product used as a sun-roof housing is formed by pressing from a sheet molding compound (hereinafter referred to as SMC) made of an unsaturated polyester resin including a predetermined additive. Further, a uni directional sheet molding compound (hereinafter referred to as UD-SMC) made of the unsaturated polyester resin is formed by pressing on both surfaces of a portion of the sun-roof housing which should be reinforced. The UD-SMC includes a bundle of glass fibers which is continuously formed so as to be arranged in the same direction. The portion of the sun-roof housing which is located near a window opening formed at a front side of the sun-roof housing is tried to be strengthened by overlaying the UD-SMC on the SMC.

However, in the foregoing sun-roof housing, the UD-SMC is expanded in the lengthwise direction of the sun-roof housing during the press formation thereof, so that the thickness of the UD-SMC is reduced after the press formation. Therefore, it is difficult to assure the strength of the portion of the sun-roof housing which should be reinforced.

SUMMARY OF THE INVENTION

It is, therefore, a primary object of the present invention to provide a fiber-reinforced plastic product which overcomes a drawback of the prior art.

The above and other objects are achieved by a fiber-reinforced plastic product comprising a first member which is formed by pressing from a sheet molding compound made of an unsaturated polyester resin and having a first portion which should be reinforced and a second portion having an area adjacent to the first portion, a second member made of a uni directional sheet molding compound made of the unsaturated polyester resin, including a bundle of glass fibers which is continuously formed so as to be arranged in the same direction, and overlayed on the first portion by the press formation, and concave portion formed in the area.

BRIEF DESCRIPTION OF THE DRAWINGS

Additional objects and advantages of the present invention will become more apparent from the following detailed description of preferred embodiments thereof when considered with reference to the attached drawings, in which.

DETAILED DESCRIPTION OF THE PREFERRED EMBODIMENTS

A fiber-reinforced plastic product of the present invention is used as a sun-roof housing for example, and the preferred embodiments will be detailed hereinbelow. A first embodiment of the present invention is explained referring to FIG. 1 and FIG. 2.

Figure 1:
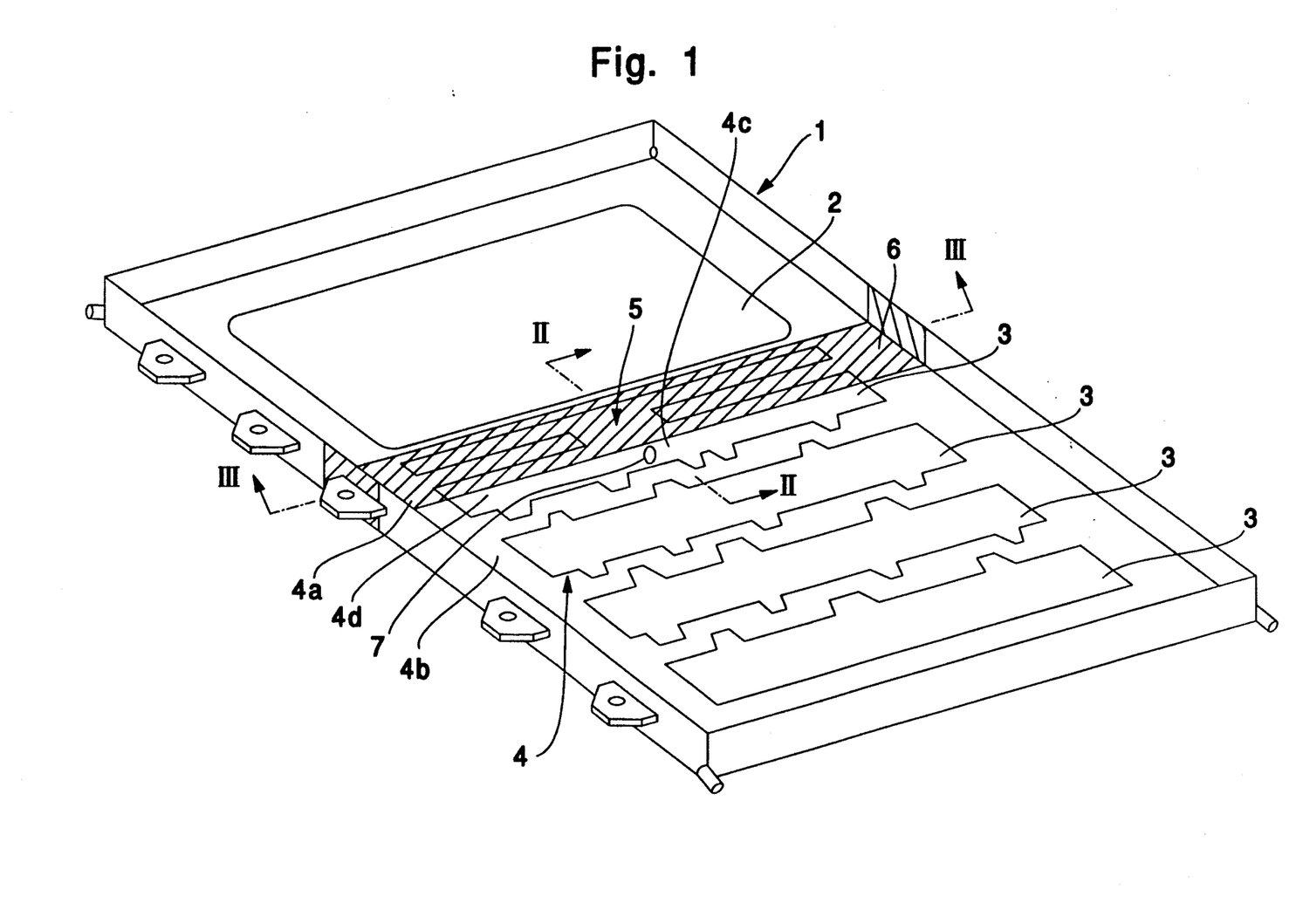
FIG. 1 is a perspective view of a fiber-reinforced plastic product used as a sun-roof housing according to a first embodiment of the present invention.

As shown in FIG. 1, a window opening 2 is formed at a front side of the sun-roof housing 1 and a plurality of ribs 3 are formed at a rear side of the sun-roof housing 1 in order to increase the strength of the rear portion of the sun-roof housing 1.

In order to form the sun-roof housing 1, a first member 4 made of a sheet molding compound (hereinafter referred to as SMC) and a pair of second members 5,5 made of a uni directional sheet molding compound (hereinafter referred to as UD-SMC) are bonded by a press formation. The first member 4 is divided into a first portion 4a on which each second member 5 is overlayed and a second portion 4b which is remained as it is. The first portion 4a is located near the opening 2 of the sun-roof housing 1 and the second portion 4b is located so as to be adjacent to the first portion 4a. The SMC is made of an unsaturated polyester resin which includes a predetermined additive composed of a predetermined filler, a predetermined low-profile additive, etc. The UD-SMC is made of the same unsaturated polyester resin as that of the SMC and has a bundle of glass fibers 5a which is continuously formed so as to be arranged in the same direction. A room lamp (not shown) is hung on an inner face of the first portion 4a of the first member 4 of the sun-roof housing 1, so that a load is applied to the first portion 4a. Therefore, the first portion 4a should be reinforced. Each of the second members 5, 5 made of the UD-SMC is connected to each surface of the first portion 4a or the shadowed portion in FIG. 1. On the other hand, the second portion 4b of the first member 4 is remained as it is.

Figure 2:
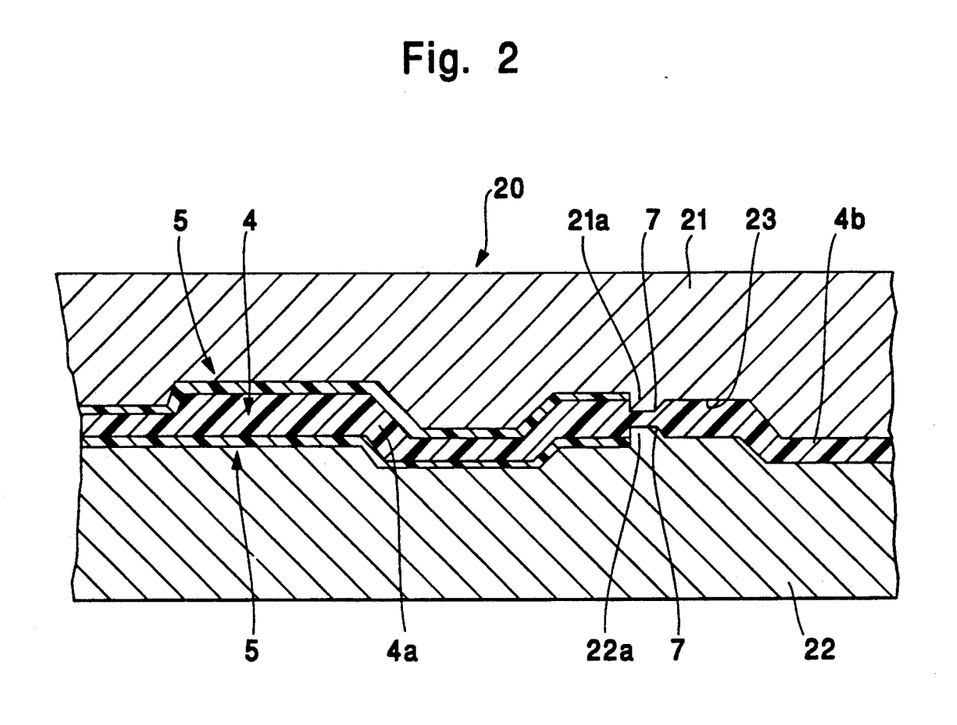
FIG. 2 is an enlarged cross-sectional view taken along the line II–II in FIG. 1 with a metal mould having upper and lower moulds.
Figure 3:
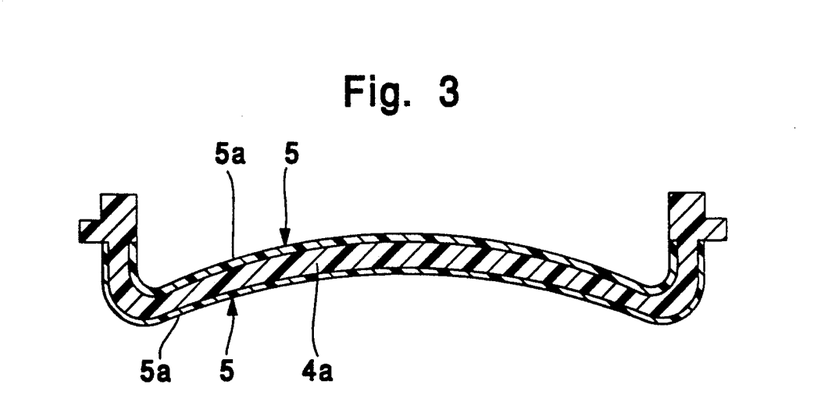
FIG. 3 is a cross-sectional view taken along the line III—III in FIG. 1.

As shown in FIG. 2, a metal mould 20 has an upper mould 21 and a lower mould 22 so as to form a cavity portion 23 herebetween. The first member 4 and the second members 5, 5 are arranged in the cavity portion 23 in such a manner that each of the second members 5, 5 is overlayed on each surface of the first portion 4a of the first member 4 which should be reinforced. The second members 5, 5 are connected to the first portion 4a by a press formation. A width of the second member 5 is 80 mm. As shown in FIG. 3, the glass fibers 5a are formed on both surfaces of the first portion 4a respectively.

Figure 14:
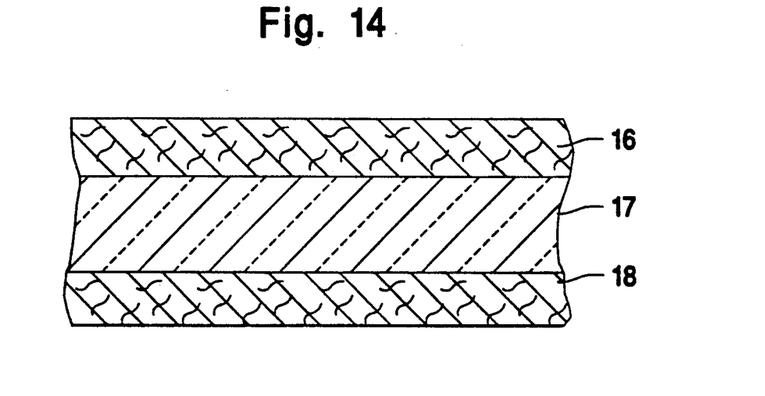
FIG. 14 is a cross-sectional view of a first member of a sun-roof housing according to the present invention but omitting a second member.

In the present embodiment, "ASMAT-121" (specific gravity: 1.30) which is supplied by Dainippon Ink and Chemicals, Inc. is used as the first member 4. As shown in FIG. 14, "ASMAT-121" has three-phase structure, namely, an upper phase 16, a middle phase 17, and a lower phase 18. Both the upper phase 16 and the lower phase 18 are made of glass fibers which are different from the glass fibers 5a of the UD-SMC, and the middle phase 17 is made of glass micro-balloons. Since "ASMAT-121" has three-phase structure, glass micro-balloons in the middle phase 17 never flow out in the upper or the lower direction in FIG. 14. Since glass micro-balloons are light, the first member 4 is light. Further, "ASMAT-004" which is supplied by Dainippon Ink and Chemicals, Inc. may be used as the first member 4 instead of "ASMAT-121". "ASMAT-004" has single phase made of the same glass fibers as that of "ASMAT-121". On the other hand, "ASMAT-311" supplied by Dainippon Ink and Chemicals, Inc. is used as the UD-SMC. A diameter of each glass fiber 5a of the UD-SMC is 13 μm.

Conditions for the press formation of the sun-roof housing 1 is as follows:

| | |
|---|---|
| temperature of upper mold | 148° C. |
| temperature of lower mold | 143° C. |
| forming pressure | 90 kg/cm² |
| duration of press formation | 3 minutes |

As shown in FIG. 1, in the sun-roof housing 1 of the first embodiment, a pair of concave portions 7,7 with each diameter of 5 mm are formed in both surfaces of the second portion 4b of the first member 4. The concave portions 7,7 are located in a center portion 4c of an area 4d adjacent to the first portion 4a of the first member 4.

As shown in FIG. 2, during the press formation of the sun-roof housing 1 the metal mold 20 is provided with a pair of projections 21a, 22a in such a manner that the upper mold 21 is provided with one projection 21a and the lower mold 22 is provided with the other projection 22a. Each of the projections 21a, 22a is brought into engagement with each of the concave portions 7,7. The thickness of the sun-roof housing 1 is about 3 mm, on the other hand, the depth of each concave portion 7 is 0.7 mm. Therefore, the thickness of the center portion 4c having the concave portions 7,7 decreases from 3.0 mm to 1.6 mm.

Thus, the present invention prevents each second member 5 made of the UD-SMC from being expanded in the lengthwise direction of the sun-roof housing 1 during the press formation of the sun-roof housing 1 due to the projections 21a, 22a which are brought into engagement with the concave portions 7,7 formed in the center portion 4c of the area 4d adjacent to the first portion 4a, so that the thickness of each second member 5 is not reduced after the press formation. Therefore, the first portion 4a on which each second member 5 is overlayed is superior in strength against the load.

A second embodiment of the present invention is explained referring to FIGS. 4 to 7. The same members as the first embodiment is shown in the same numbers as the first embodiment hereinafter and the explanation hereof is omitted hereinafter.

Figure 4:
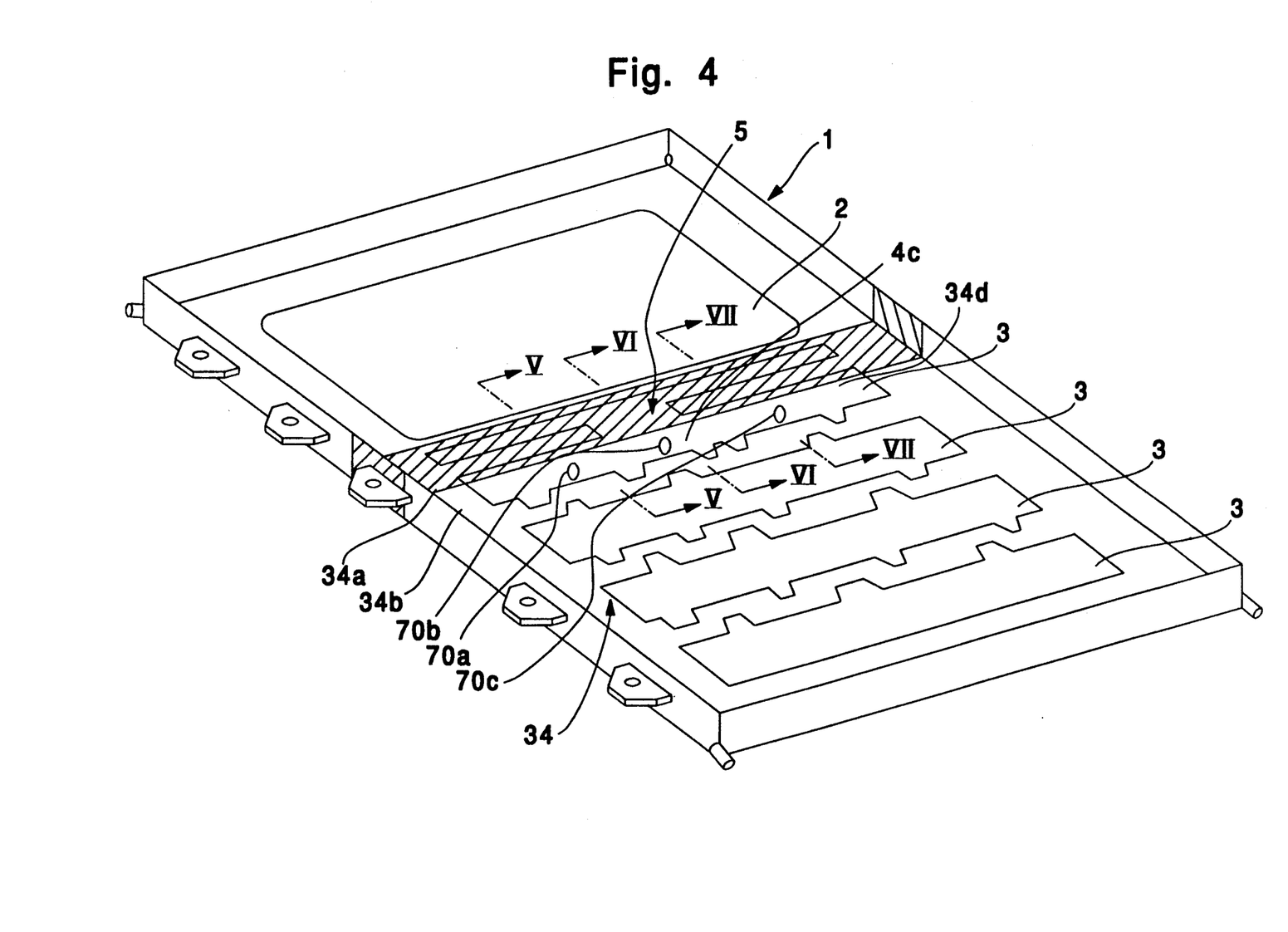
FIG. 4 is a perspective view of a fiber-reinforced plastic product used as a sun-roof housing according to a second embodiment of the present invention.

As shown in FIG. 4, a first member 34 is divided into a first portion 34a on which each second member 5 is overlayed and a second portion 34b which is remained as it is. Six concave portions 70 are formed in both surfaces of the second portion 34b. The concave portions 70 are located in an area 34d adjacent to the first portion 34a. The concave portions 70 comprises a pair of first concave portions 70a, 70a, a pair of second concave portions 70b, 70b, and a pair of third concave portions 70c, 70c. Each second concave portion 70b corresponds to each concave portion 7 of the first embodiment. A distance between each first concave portion 70a and each second concave portion 70 b adjacent thereto is set to be 300 mm, and a distance between each second concave portion 70b and each third concave portion 70c adjacent thereto is set to be 300 mm. Each distance corresponds to that between the V—V line and the VI—VI line or that between the VI—VI line and the VII—VII line. Both a depth and a diameter of each concave portion are same as those of each concave portion 7 of the first embodiment, respectively.

Figure 5:
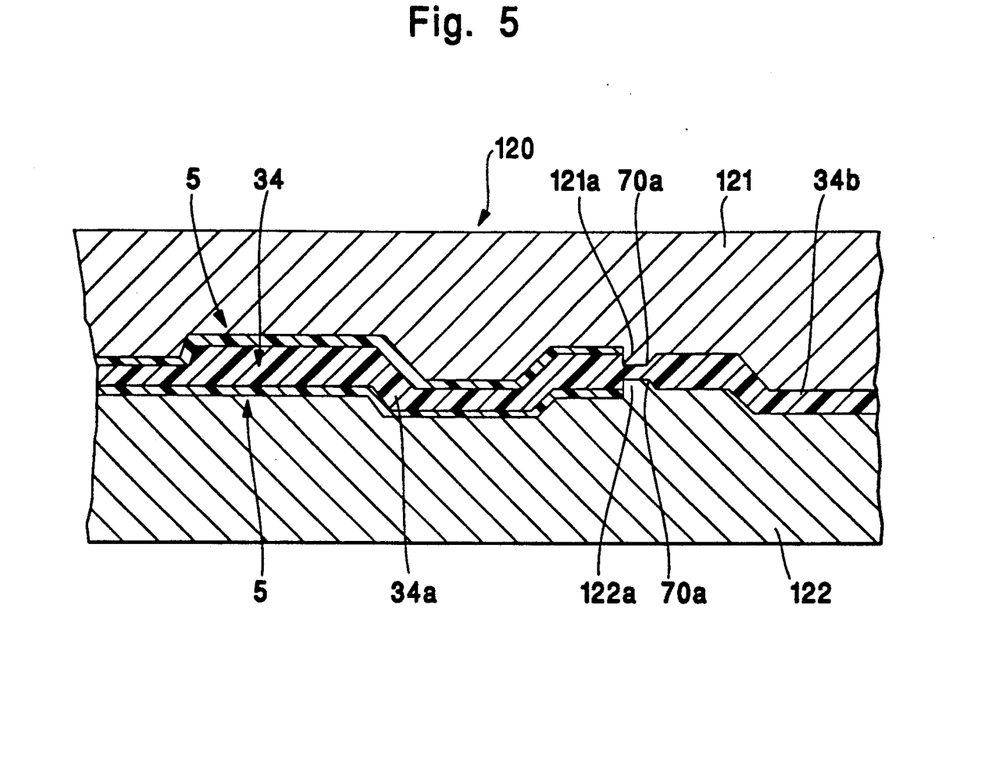
FIG. 5 is an enlarged cross-sectional view taken along the line V—V in FIG. 4 with a metal mould having upper and lower moulds.
Figure 6:
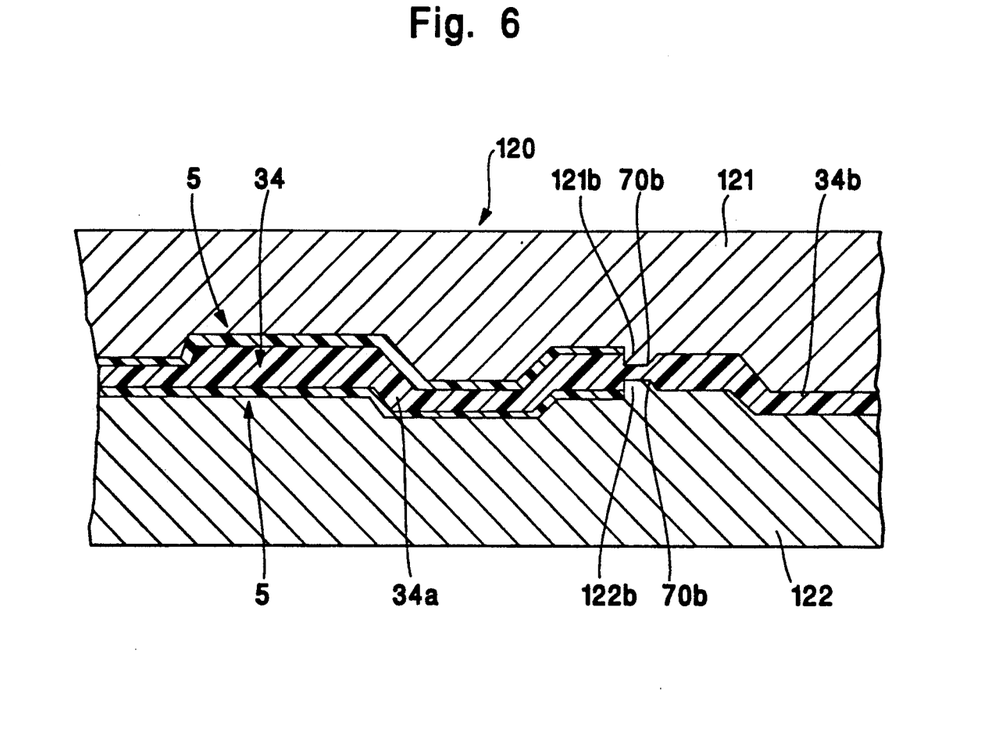
FIG. 6 is an enlarged cross-sectional view taken along the line VI—VI in FIG. 4 with the metal mould having upper and lower moulds.
Figure 7:
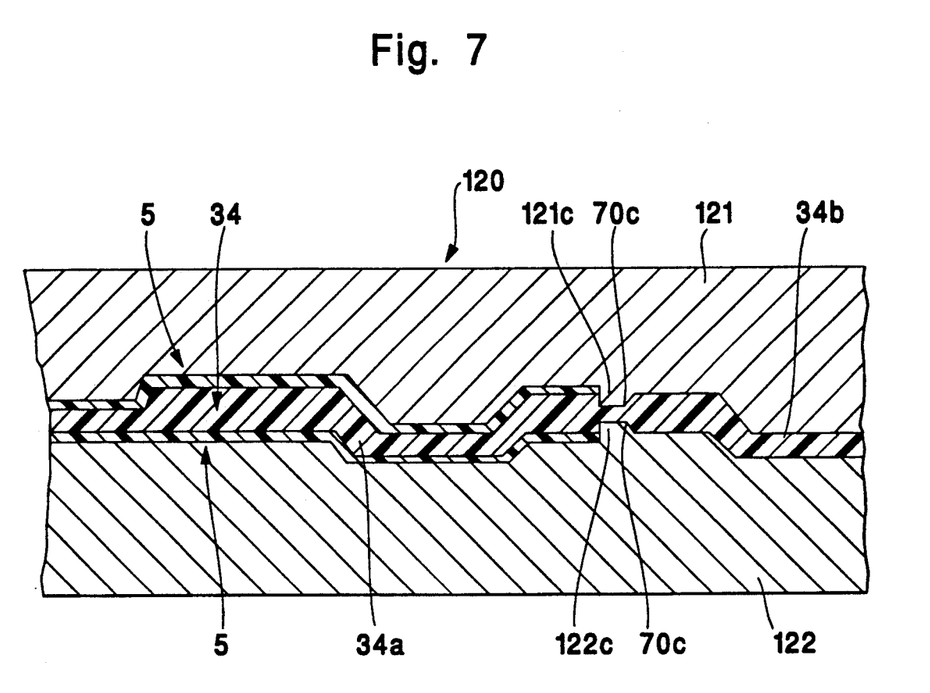
FIG. 7 is an enlarged cross-sectional view taken along the line VII—VII in FIG. 4 with the metal mould having upper and lower moulds.

As shown in FIGS. 5 to 7, a metal mould 120 has an upper mould 121 and a lower mould 122. During the press formation of the sun-roof housing 1 the metal mold 120 is provided with six projections, namely a pair of first projections 121a, 122a, a pair of second projections 121b, 122b, and a pair of third projections 121c, 122c. Each of the first projections 121a, 122a is brought into engagement with each first concave portion 70a. Each of the second projections 121b, 122b is brought into engagement with each second concave portion 70b. Each of the third projections 121c, 122c is brought into engagement with each third concave portion 70c.

Figure 8:
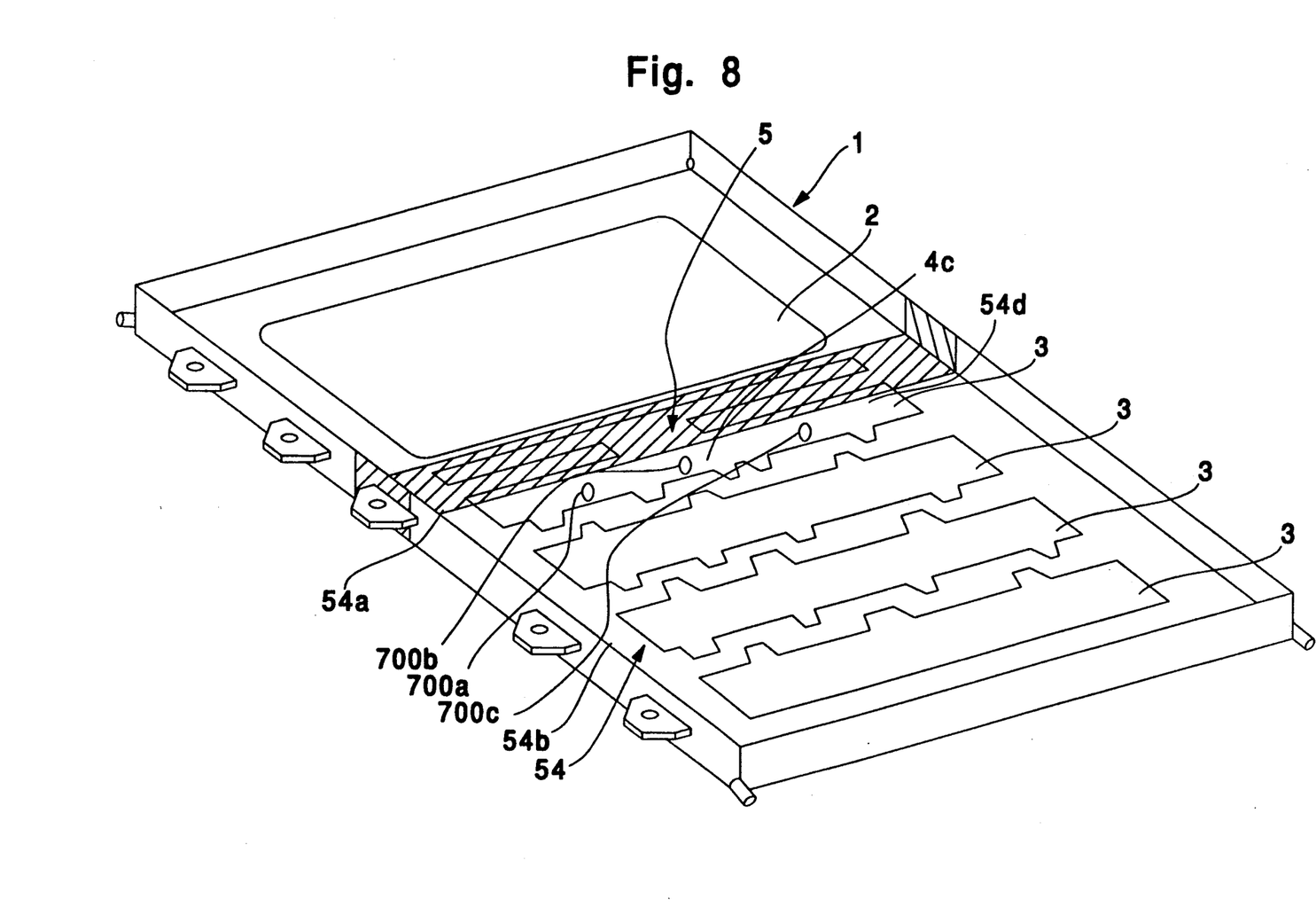
FIG. 8 is a perspective view of a fiber-reinforced plastic product used as a sun-roof housing according to a third embodiment of the present invention.

A third embodiment of the present invention is explained referring to FIG. 8.

A first member 54 is divided into a first portion 54a on which each second member 5 is overlayed and a second portion 54b which is remained as it is. Three concave portions 700 are formed in either an upper surface or a lower surface of the second portion 54b.

The concave portions 700 are located in an area 54d adjacent to the first portion 54a. The concave portions 700 comprises a first concave portion 700a, a second concave portion 700b, and a third concave portion 700c. The first concave portion 700a corresponds to one of the first concave portion 70a of the second embodiment. The second concave portion 700b corresponds to one of the second concave portion 70b of the second embodiment. The third concave portion 700c corresponds to one of the third concave portion 70c of the second embodiment. During the press formation of the sun-roof housing 1 a metal mould (not shown) is provided with three projections (not shown) each of which is brought into engagement with each of the concave portions 700.

Figure 9:
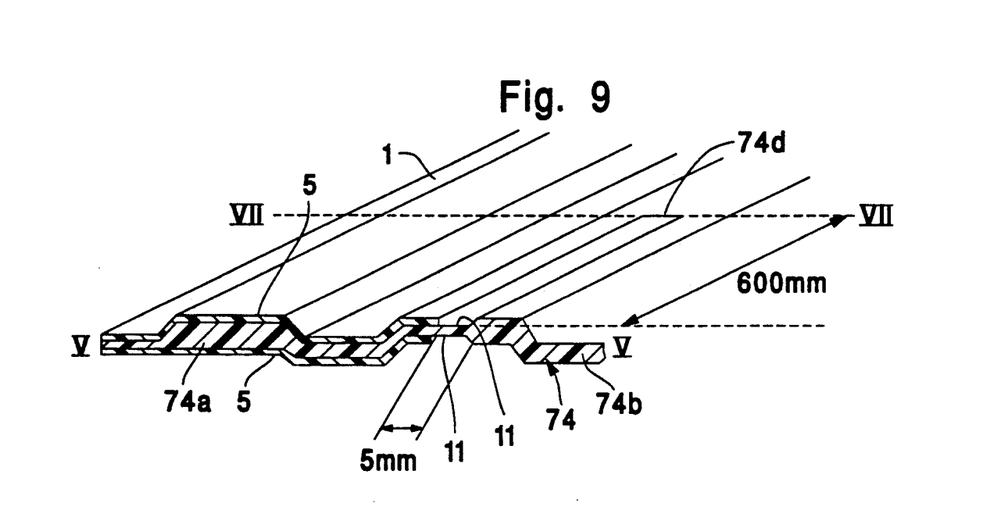
FIG. 9 is a perspective view of a fiber-reinforced plastic product, with a cross-section in part, used as a sun-roof housing according to a fourth embodiment of the present invention.

A fourth embodiment of the present invention is explained referring to FIG. 9.

A first member 74 is divided into a first portion 74a on which each second member 5 is overlayed and a second portion 74b which is remained as it is. A pair of grooved concave portions 11,11 are formed in both surfaces of the second portion 74b. The grooved concave portions 11,11 are located in an area 74d adjacent to the first portion 74a. The length of each grooved concave portion 11 is 600 mm and it corresponds to a distance between the V—V line and the VII—VII line. Instead of the circular concave portions 7,7 in the first embodiment, the grooved concave portions 11,11 are adopted in the fourth embodiment. A width and a depth of each grooved concave portion 11 are 5 mm and 0.7 mm, respectively. During the press formation of the sun-roof housing 1, a metal mold (not shown) is provided with a pair of bar-shaped projections (not shown) each of which is brought into engagement with each of the grooved concave portions 11, 11.

Figure 12:
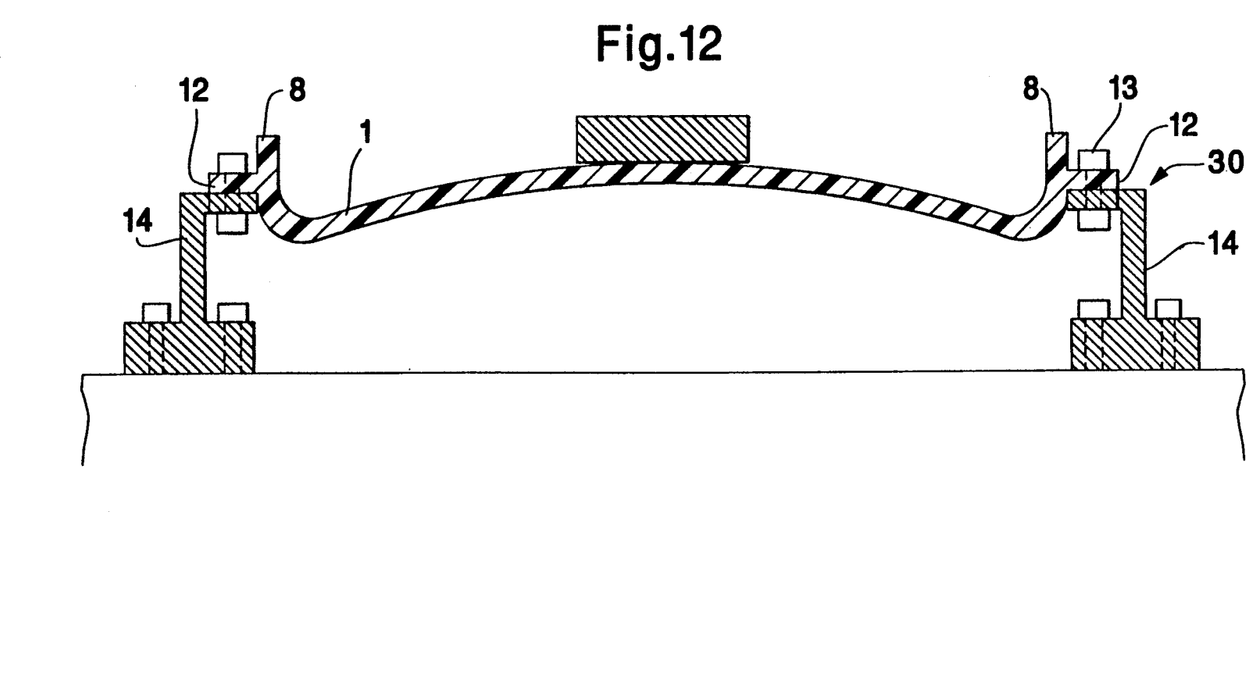
FIG. 12 is a cross-sectional view of a fiber-reinforced plastic product with a device for performing the dead load test according to each embodiment of the present invention.
Figure 13:
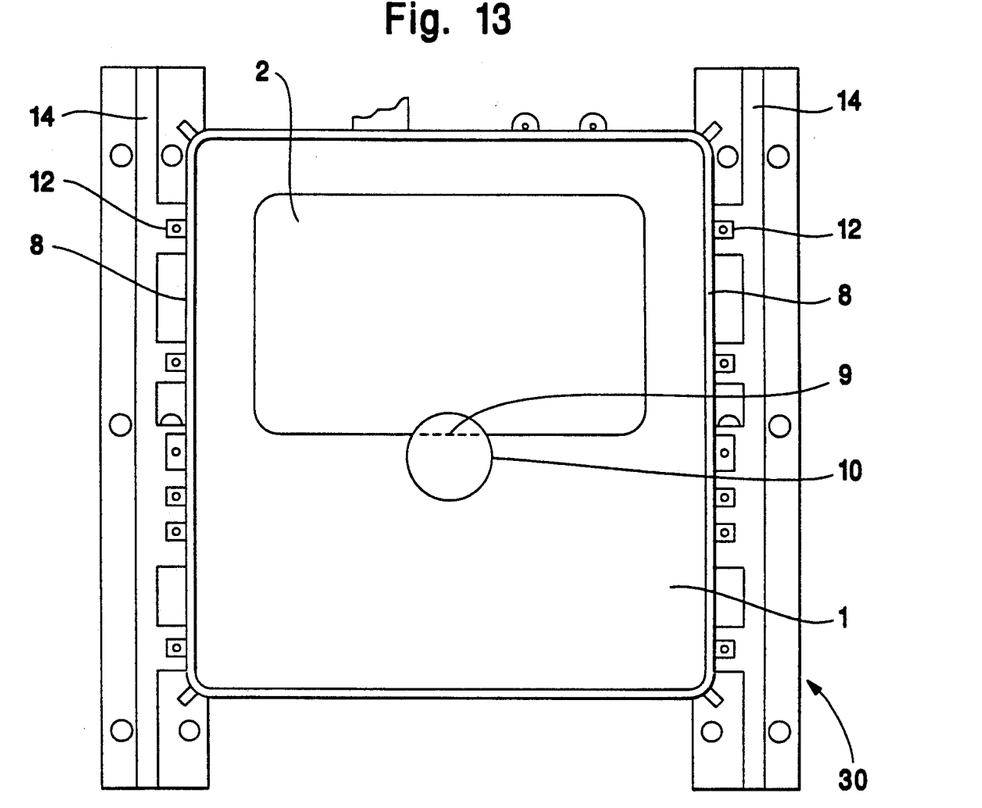
FIG. 13 is a plane view of a fiber-reinforced plastic product with a device for performing the dead load test according to each embodiment of the present invention.

The sun-roof housings 1 of the foregoing embodiments are evaluated by measuring the width of each second member 5 after the press formation and performing dead load test. The width of each second member 5 is measured along three lines, namely the V—V line, the VI—VI line and the VII—VII line in FIG. 4. On the other hand, the dead load test is performed as follows: As shown in FIG. 12 and FIG. 13, a pair of furnishing portions 12,12 formed on both sides 8,8 of the sun-roof housing 1 are fixed to a pair of fixing jigs 14,14 of a device 30 for performing the dead load test. A load of 5 kg or 10 kg is applied to a circled portion 10 whose center is situated at a point 40 mm apart from a rear end portion 9 of the opening 2, and the deflection of the rear end portion 9 is finally measured.

Figure 15:
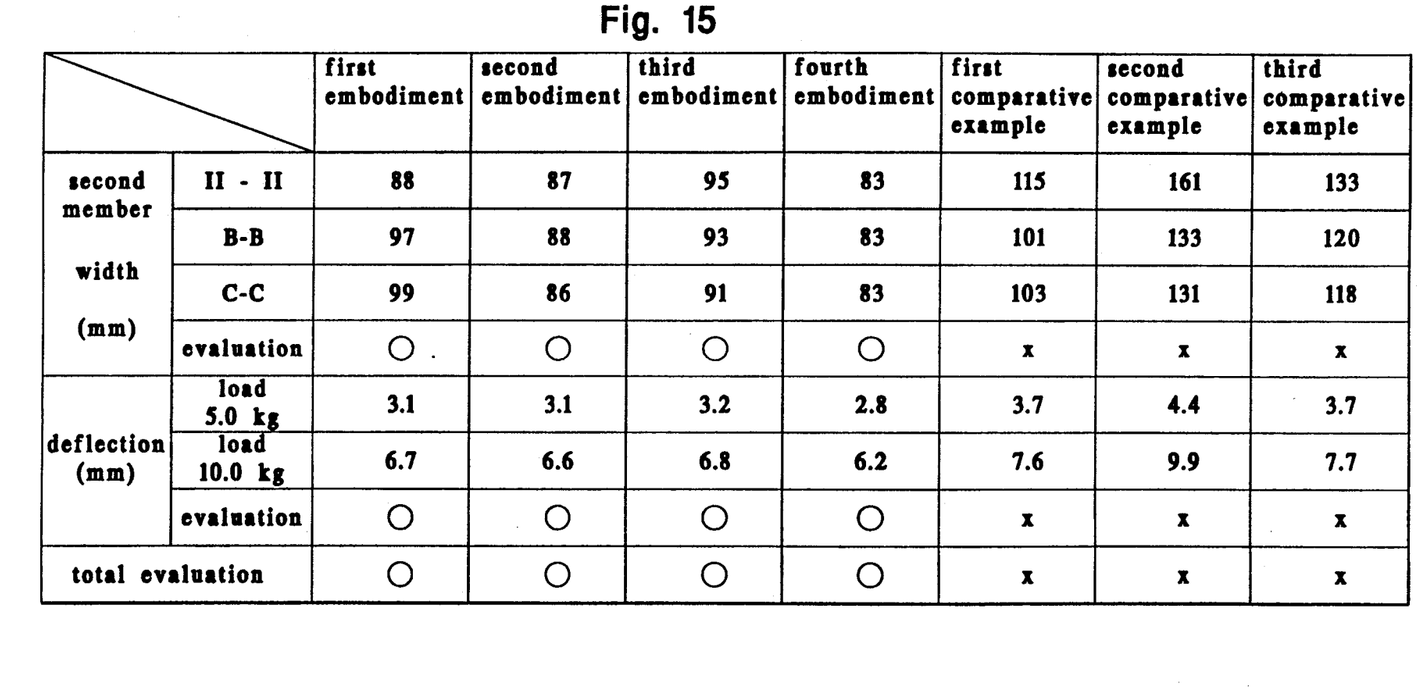
FIG. 15 is a table showing the evaluation of each embodiment according to the present invention and each comparative example.
Figure 16:
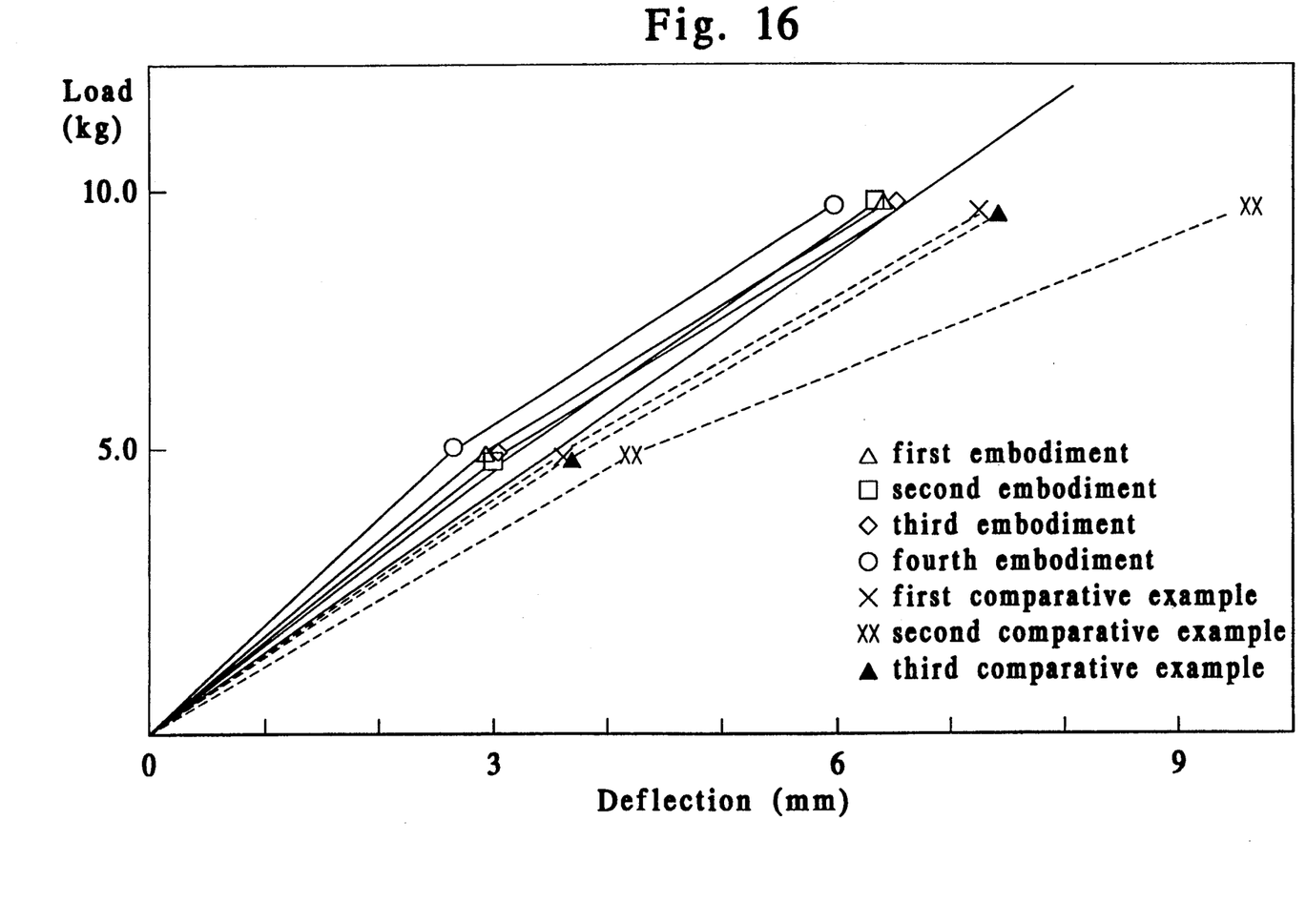
FIG. 16 is a diagram which shows an examination result of the deflection of sun-roof housing of each embodiment according to the present invention and each comparative example.

The evaluation of the width of each second member 5 is performed as follows: If the width of each second member 5 is less than 100 mm, the evaluation is deemed to be good. On the other hand, if the width of each second member 5 is 100 mm or above, the evaluation is deemed to be poor. The evaluation of the deflection is performed as follows: If the deflection is less than 3.5 mm upon application of 5.0 kg and the deflection is less than 7.0 mm upon application of 10.0 kg, the evaluation is deemed to be good. On the other hand, if results other than the foregoing, the evaluation is deemed to be poor. The result of the foregoing evaluation is shown in FIG. 15 and FIG. 16. As seen from FIG. 15 and FIG. 16, the total evaluation of both the width of each second member 5 and the deflection by applying the load in each embodiment is proved to be good. Especially, the fourth embodiment is proved to be most excellent in the present invention.

Comparative examples compared with the present invention are explained hereinbelow.

Figure 10:
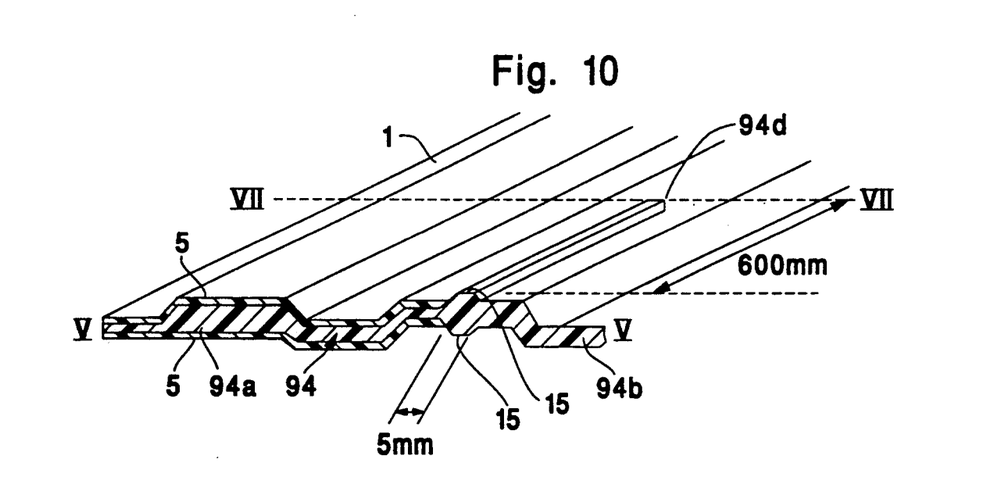
FIG. 10 is a similar view to FIG. 9 in part but showing a first comparative example compared with the present invention.

In a first comparative example as shown in FIG. 10, a first member 94 is divided into a first portion 94a on which each second member 5 is overlayed and a second portion 94b which is remained as it is. A pair of bar-shaped convex portions 15,15 are formed in both surfaces of the second portion 94b. The bar-shaped convex portions 15,15 are located in an area 94d adjacent to the first portion 94a. Each of bar-shaped convex portions 15,15 is 5 mm, 0.5 mm, and 600 mm in width, height, and length, respectively.

Figure 11:
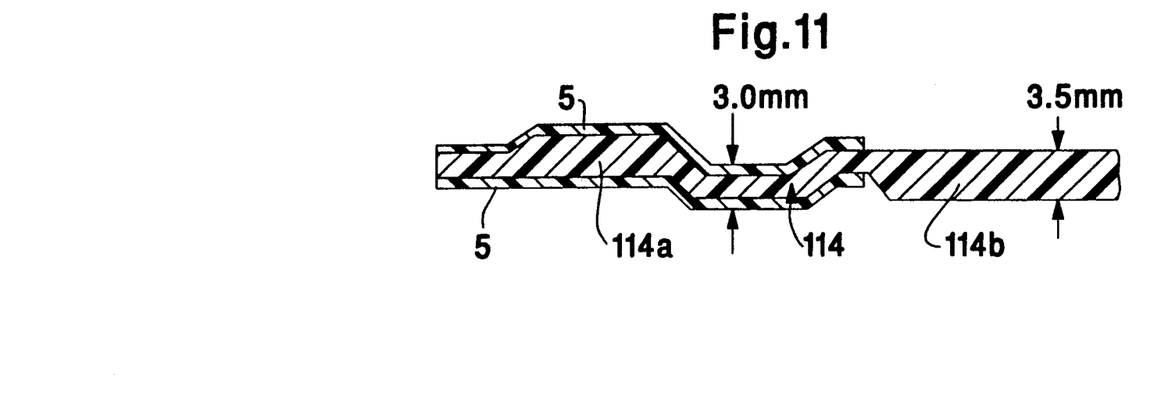
FIG. 11 is a cross-sectional view of a fiber-reinforced plastic product used as a sun-roof housing but showing a second comparative example compared with the present invention.

In a second comparative example as shown in FIG. 11, a first member 114 is divided into a first portion 114a on which each second member 5 is overlayed and a second portion 114b which is remained as it is. The second portion 114b is increased up to 3.5 mm by the 0.5 mm increment of the thickness of a lower surface thereof.

A third comparative example is similar to the foregoing prior art disclosed in Japanese utility model application laid-open publication No. 3(1991)-7027. In other words, neither the foregoing concave portion 7 nor the foregoing convex portion 15 is formed.

The evaluation of each of the foregoing comparative examples is performed in the same manner as the foregoing matter. The examination result is shown in FIG. 15 and FIG. 16.

The number of the concave portions 7 may be above six and the grooved concave portions 11 may be plural.

Obviously, numerous modifications and variations of the present invention are possible in light of the above teaching. It is therefore to be understood that the scope of the appended claims or the invention may be practiced otherwise than as specifically described herein.

What is claimed is:

1. A fiber-reinforced plastic product comprising:
    a first member which is formed by pressing from a sheet molding compound made of an unsaturated polyester resin and having a first portion and a second portion for reinforcing the first portion, and having an area adjacent to the first portion;
    a second member made of a uni directional sheet molding compound made of the unsaturated polyester resin, including a bundle of glass fibers which is continuously formed so as to be arranged in the same direction, and overlayed on the first portion by the press formation; and
    a concave portion formed in the area.

2. A fiber-reinforced plastic product as set forth in claim 1, wherein the concave portion is circular.

3. A fiber-reinforced plastic product as set forth in claim 1, wherein the concave portion is formed into a grooved shape.

4. A fiber-reinforced plastic product as set forth in claim 1, wherein the concave portion is formed in each surface of the area.

5. A fiber-reinforced plastic product as set forth in claim 1, wherein there are plural concave portions formed in the area.

* * * * *